United States Patent Office 3,401,672
Patented Sept. 17, 1968

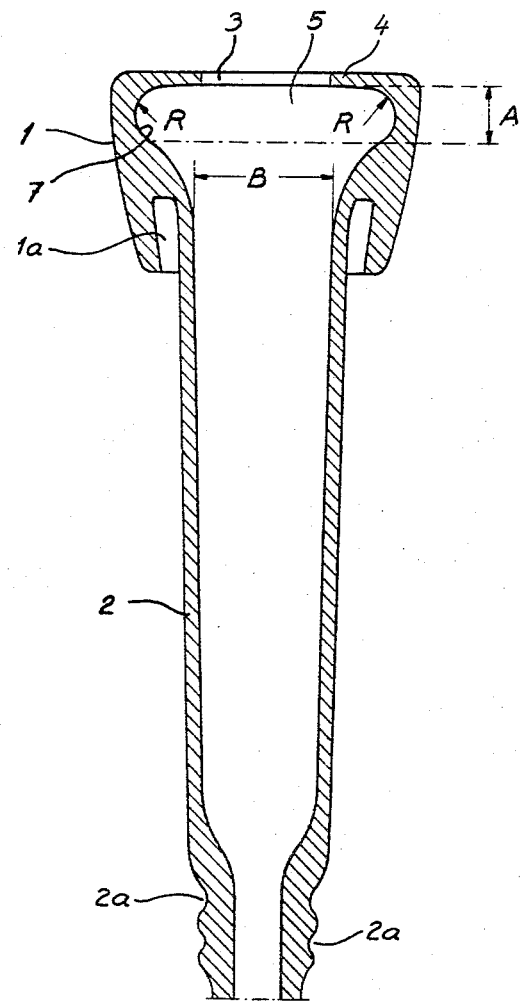

3,401,672
TEAT CUP LINER
Karl Lennart Berglind, Stockholm, Sweden, assignor to Alfa-Laval AB, Tumba, Sweden, a corporation of Sweden
Filed June 21, 1966, Ser. No. 559,196
Claims priority, application Sweden, June 24, 1965, 8,429/65
2 Claims. (Cl. 119—14.49)

ABSTRACT OF THE DISCLOSURE

The top part of the teat cup defines a laterally-enlarged hollow space opening downwardly into the upper end of the cup's depending tubular body, where the latter has a predetermined inner diameter, the top part having at its upper end a flat wall provided with an opening for insertion of a teat, the lower portion of the top part forming an annular groove for receiving the upper end of a teat cup shell adapted to maintain the tubular body in longitudinally stretched condition. The liner is characterized in that the part of the hollow space adjacent the flat end wall has a circumferential wall the inner surface of which, as viewed in an axial section of the liner, is concave and of substantially semicircular shape, the radius of the semicircular shape being such a fractional part of said inner diameter of the tubular body that the axial length of said hollow space is substantially equal to but no greater than one-half of said inner diameter.

---

The present invention relates to liners of teat cups for milking machines.

The type of liner to which the invention relates more particularly comprises a laterally-enlarged top part with a substantially flat end wall provided with an opening for the insertion of a teat, and a tubular body extending from the top part and adapted to surround the teat along its entire length below the top part. This tubular body is arranged to be stretched lengthwise by a surrounding shell of metal or the like which is seated at one end in an annular groove formed by the top part of the liner and is engaged at its other end in an annular recess on the outside of the tubular body. Under the action of vacuum and atmospheric pressure, prevailing alternately in the space between the tubular body of the liner and the surrounding shell, the tubular body exerts the effect on the teat necessary for the milking.

Thorough investigations have shown that the milking action and the yield of milk as well as the effect on the milked animal can be substantially improved, as compared with the results obtained by means of teat cup liners previously known, by forming the top part of the teat cup liner so that its hollow space is more flattened than is generally the case and is given a comparatively short axial length.

In the most suitable form of liner found by these investigations, the part of the hollow space which is adjacent the flat end wall of the top part, viewed in axial section, has a semicircular circumferential wall, the radius of which is such a fractional part of the largest inner diameter of the tubular body that the axial length of the part of the hollow space surrounded by the circumferential wall is equal to or less than half of the aforesaid diameter.

Due to this shape of the part of the hollow space adjacent the teat root, the walls of the hollow space are substantially more resistant to compression than the corresponding walls of teat cup liners hitherto known, and yet an adequate volume of the hollow space is assured.

In the accompanying drawings, the single illustration is a longitudinal sectional view of a teat cup liner according to the present invention.

The liner as illustrated comprises a laterally enlarged top part 1 and a tubular body 2 depending from the top part. When the liner is assembled in the teat cup, the tubular body 2 is stretched lengthwise by the usual surrounding shell (not shown), one end of which is seated in an annular groove 1a formed by the top part, the other end of the shell being engaged in an annular groove 2a in the lower portion of the tubular body. The teat is inserted through a central opening 3 in an end wall 4 of the top part 1.

The end wall 4 is flatter than is generally the case in prior teat cup liners. Moreover, the transition from the hollow space 5 of the top part 1 to the channel of tubular body 2 is substantially shorter in the axial direction than in prior teat cup liners. Thus, the portion of the top part 1 which is adjacent the end wall 4 has a more flattened form than is usually the case. More particularly, a circumferential wall 7 having a semicircular shape, as viewed in axial section in the drawing, surrounds the hollow space 5; and the radius R of this semicircular shape is such a fractional part of the largest inner diameter B of the tubular body 2 that the axial length A of the portion of hollow space 5 surrounded by circumferential wall 7 is equal to or less than one-half the diameter B.

The above-described embodiment of the invention provides an increased resistance to compression of the top part 1, particularly in the axial direction but also radially, as compared with prior teat cup liners having a corresponding wall thickness.

I claim:
1. A teat cup liner comprising a top part and a tubular body depending from said top part, the top part defining a laterally-enlarged hollow space opening downwardly into the upper end of said tubular body where said body has a predetermined inner diameter, the top part having at its upper end a flat wall provided with an opening for insertion of a teat, the lower portion of said top part forming an annular groove for receiving the upper end of a teat cup shell adapted to maintain the tubular body in longitudinally stretched condition, said liner being characterized in that the part of said hollow space which is adjacent said flat end wall has a circumferential wall of concave and substantially semicircular shape as viewed in an axial section of the liner, the radius of said semicircular shape being such a fractional part of said inner diameter of the tubular body that the axial length of said part of the hollow space is substantially but no greater than one-half of said inner diameter.
2. A liner as defined in claim 1, in which said inner diameter of the tubular body is its maximum inner diameter.

References Cited

FOREIGN PATENTS

| 72,019 | 1/1951 | Denmark. |
|---|---|---|
| 1,046,048 | 7/1953 | France. |
| 159,183 | 10/1954 | Great Britain. |
| 804,185 | 11/1958 | Great Britain. |

ALDRICH F. MEDBERY, *Primary Examiner.*